United States Patent [19]

Grimes et al.

[11] Patent Number: 5,185,824
[45] Date of Patent: Feb. 9, 1993

[54] OPTICAL SWITCH INCORPORATING MOLDED OPTICAL WAVEGUIDE ELEMENTS

[75] Inventors: Gary J. Grimes; Allen L. Larson, both of Thornton, Colo.

[73] Assignee: AT&T Bell Laboratories, Murray Hill, N.J.

[21] Appl. No.: 784,351

[22] Filed: Oct. 29, 1991

[51] Int. Cl.5 .......................... G02B 6/00; G02B 6/36
[52] U.S. Cl. .................................... 385/19; 250/229; 359/54
[58] Field of Search ............................ 385/15, 19, 24; 250/229; 359/54, 277

[56] References Cited

U.S. PATENT DOCUMENTS 4,844,577 7/1989 Ninnis et al. ................. 385/19 X
4,910,396 3/1990 Grove ............................ 250/229

OTHER PUBLICATIONS

"Switching Matrix for Optical Signals," NASA Tech Briefs, Sep. 1990, pp. 22, 24.

*Primary Examiner*—Akm E. Ullah
*Attorney, Agent, or Firm*—David R. Padnes

[57] ABSTRACT

A structure for providing an N by N optical switch includes input and output structures disposed on either side of a planar electronic shutter array. Each of the input and output structures, which respectively provide optical signal splitting and combining, is realized by the stacking of N molded optical elements. Each element is formed of a plurality of molded materials with one providing an optical waveguide and the other providing a supporting structure for such waveguides. Advantageously, both the input and output structures utilize the same molded optical element and are fabricated in an identical manner. After such fabrication, the one structure to be designated as the output structure is rotated 90 degrees with respect to the input structure prior to abutment against the planar electronic shutter array.

18 Claims, 5 Drawing Sheets

OPTICAL SWITCH INCORPORATING MOLDED OPTICAL WAVEGUIDE ELEMENTS

TECHNICAL FIELD

The present invention relates to an optical switch incorporating molded optical splitter and combiner elements.

BACKGROUND OF THE INVENTION

Prior art photonic switching systems have used a plurality of planar devices to provide optical splitting and combining capabilities. One such arrangement, disclosed in U.S. Pat. No. 5,009,477 to Alferness et al., forms a crossbar switch having a stack of M splitter plates, each of which routes an injected optical signal to one of N outputs, and a stack of N combiner plates, each of which routes the signal of a selected one of the M inputs to a common output. Each splitter and combiner plate is formed from electro-optic elements, such as lithium niobate substrates. Another such switching arrangement, disclosed in a NASA Tech. Brief, dated September, 1990, employs an electronic shutter element wherein each electronic shutter in an array of such shutters can either be transparent or opaque to an optical signal. The electronic shutter element is planar and is disposed between optical signal splitting and signal combining devices. The signal splitting and combining devices are formed by etching quartz crystalline wafers.

The problem with the above described structures is that they are quite expensive and utilize brittle, rigid materials which cannot meet the shock and vibration objectives of a number of optical switching applications.

Molding of plastic materials to provide optical waveguiding capabilities is well-known and one such arrangement, disclosed in U.S. Pat. No. 4,995,686, issued Feb. 26, 1991 to Blonder et al., discloses the use of molded material to couple an optical signal from a first number of input optical fibers to a second different number of output optical fibers. While this structure is inexpensive, the disclosed structure in not suitable for a switching structure.

SUMMARY OF THE INVENTION

The present invention overcomes the limitations of the prior art by replacing the costly electro-optic or fused quartz crystalline structures with molded plastic optical waveguide splitters and combiners. Each splitter and combiner utilizes a molded substrate material having a first optical waveguiding channel which intersects with a plurality of second optical waveguiding channels. These first and second channels are filled with a resin material which bonds to an optical fiber prior to hardening. Specifically, in a splitter, the first channel receives an associated input optical fiber while, in a combiner, each of the second channels receives an associated output optical fiber. The optical switch is formed by arranging a stack of optical splitters and disposing this stack on one side of an electronic shutter element having an array of shutters. A similar stack of splitter elements is arranged, rotated 90 degrees with respect to the optical splitter stack and disposed on the other side of the electronic shutter element. The resulting switch structure provides an inexpensive, rugged device. The use of molded splitters and combiners allows these elements to be produced in complex shapes which can incorporate optical components, such as optical fiber pigtails and lenses, and features to facilitate the formation of each stack of splitters and combiners.

DETAILED DESCRIPTION

Figure 1:
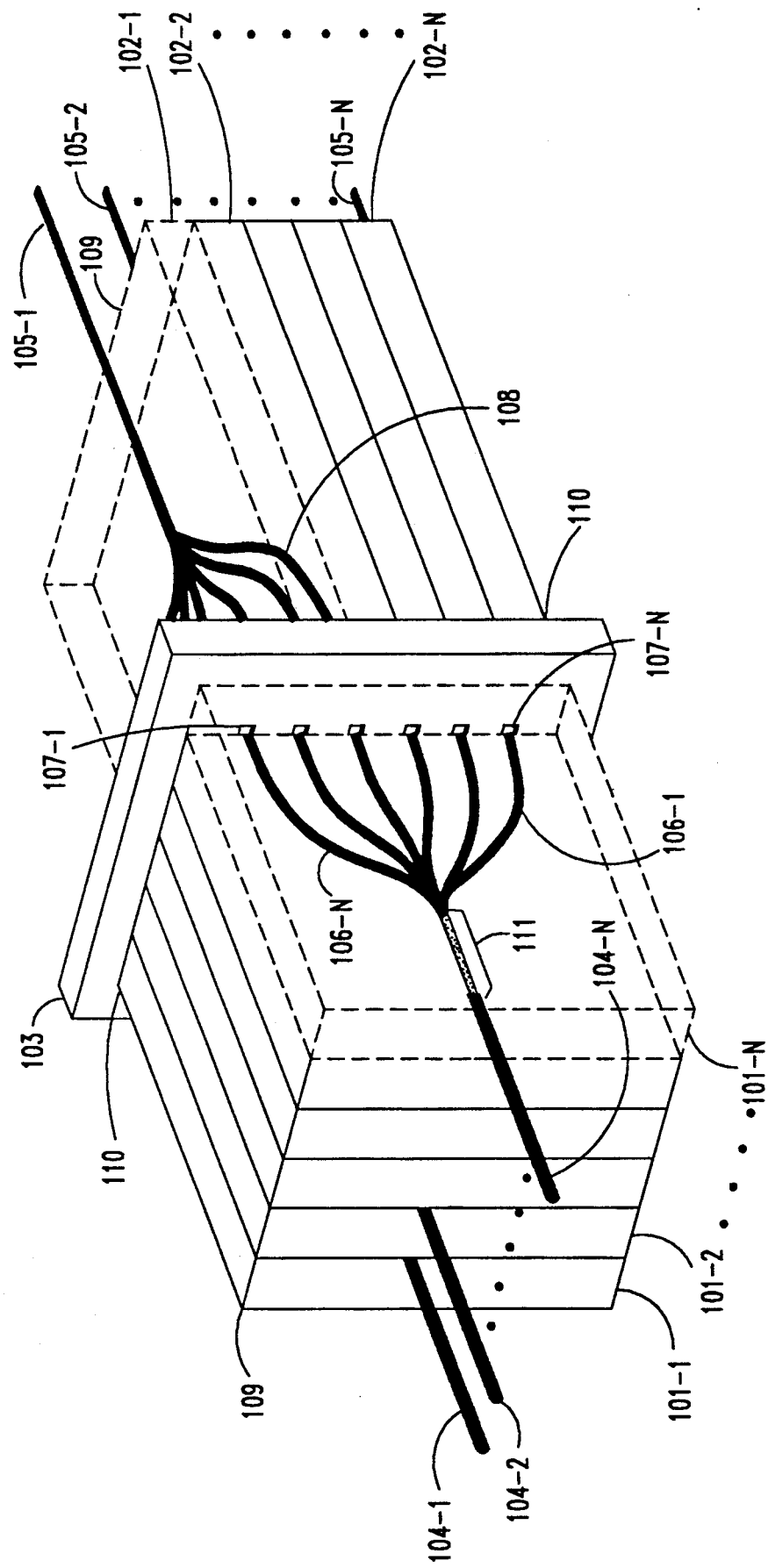
FIG. 1 shows a perspective view of a first embodiment of an optical switch in accordance with the present invention.

FIG. 1 shows a first embodiment of the present invention using two stacks of molded polymeric waveguide plates. Each stack includes N waveguide plates where N is a predetermined integer. The input plates 101-1 through 101-N are arranged to form a stack of input optical signal splitters having ends 109 and 110. Input optical fibers 104-1 through 104-N, respectively inserted a predetermined distance into region 111 of each of plates 101-1 through 101-N, conduct optical signals therethrough to ends 110. Within each plate, an associated optical signal is coupled through region 111 and thence divided into N signals which are coupled through regions 106-1 through 106-N and which all terminate at end 110. Each of the plates 101-1 through 101-N is formed of a first molded substrate material which provides channels which define the first and second regions. Preferably, this substrate material is transparent or semi-transparent at the wavelength of the optical signal provided by the associated input optical fiber to minimize signal losses. These first and second regions are then filled with a second polymeric material which has a refractive index sufficiently lower than that of the first material to provide optical signal waveguiding. Advantageously, the second material is one which fuses to the associated input optical fiber. In applications where such fibers are multimode, region 111 provides mode mixing and is made long enough to assure that the optical energy is evenly distributed to all other regions 106-1 through 106-N. The length of the mode mixing region can be advantageously shortened by the inclusion of transparent microparticles 112 which are suspended in the second polymeric material.

Regions 106-1 through 106-N at end 110 are abutted and aligned to respective ones of shutter elements 107-1 through 107-N of shutter array 103. Shutter array 103 includes an N by N array of shutter elements so that the ends of regions 106-1 through 106-N are aligned with respective ones of the shutter elements in a vertical column of N such elements. Array 103 is well known in the art and may advantageously be a ferroelectric liquid crystal spatial light modulator array or a magneto-optical spatial light modulator array. Each of the shutter elements in the N by N array can be selectively controlled by electrical signals to either conduct or block any received optical signal. In light of the foregoing, it should be realized that each plate 101-1 through 101-N distributes an optical signal to an entire vertical column of elements of shutter array 103 and that by controlling each element in a column to be either transparent or opaque, the optical signal coupled to an element may be either conducted through that element or blocked.

Each of the output optical signal combining plates 102-1 through 102-N is arranged in a stack of N plates and then rotated 90 degrees with respect to the stack of signal splitting plates. Each combining plate is aligned and abutted to a different horizontal row of shutter elements in shutter array 103 and combines the optical signal emanating therefrom to couple such signals to an associated one of output optical fibers 105-1 through 105-N. Each optical combining plate is fabricated in an identical manner to that described for the signal splitting plates and in the stack of combining plates, end 110 is also adjacent to shutter array 103. With the foregoing described optical switch structure, the signal on any input fiber 104-1 through 104-N can be switched to any output fiber 105-1 through 105-N. Additionally, signals in input fibers 104-1 through 104-N may be broadcast to all output fibers 105-1 through 105-N or multicast to any combination of output fibers 105-1 through 105-N. The term multicast as used herein means that a plurality but not all of fibers 105-1 through 105-N receive a signal from one of fibers 104-1 through 104-N.

Figure 2:
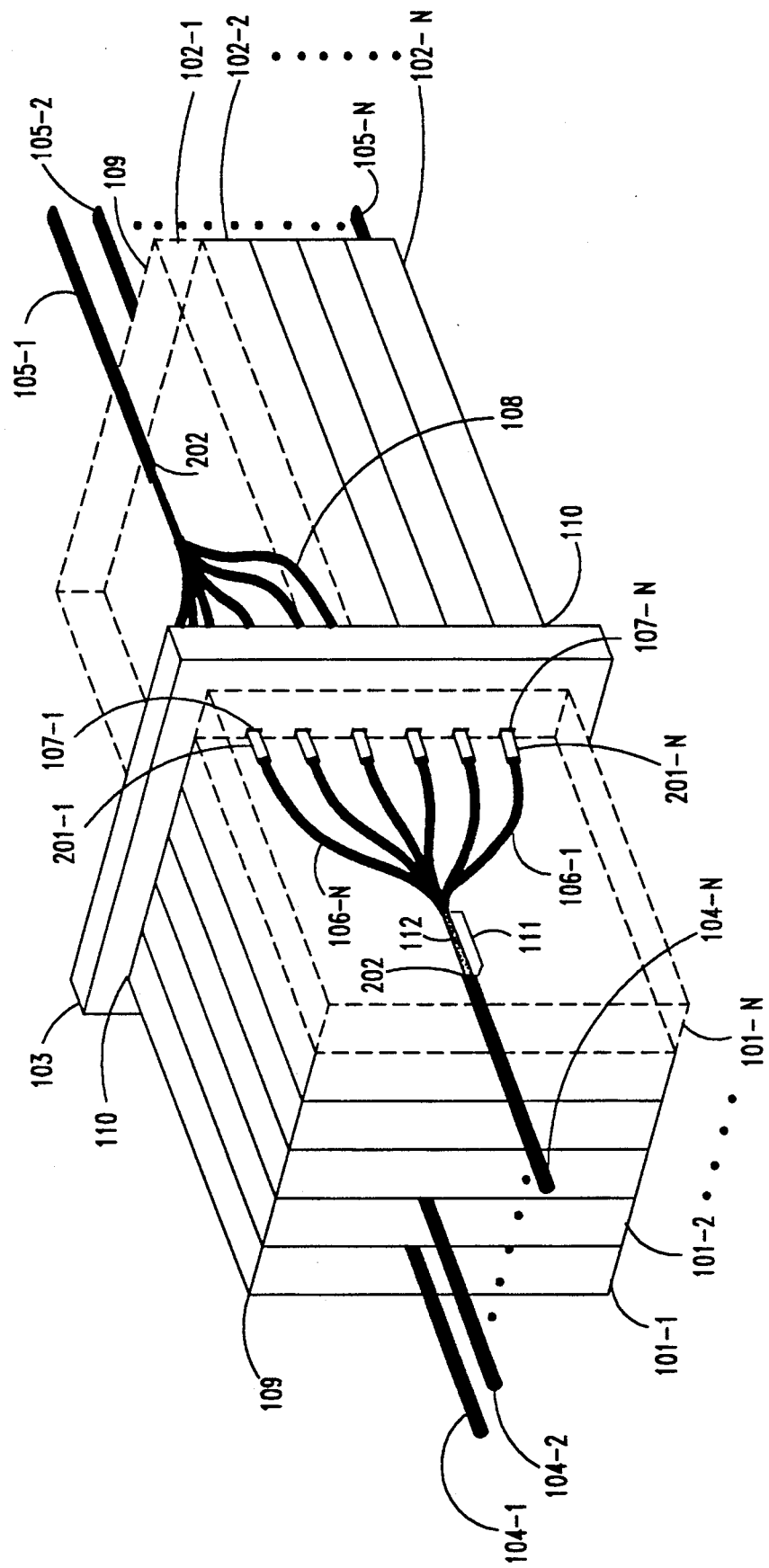
FIG. 2 shows a second embodiment of an optical switch in accordance with the present invention.

FIG. 2 illustrates how the molded plates of the invention may be modified in accordance with a second embodiment of the present invention to accommodate additional optical elements. Referring to FIG. 2, the ends of each of the regions 106-1 through 106-N are enlarged to form a respective cavity 201-1 through 201-N. Each of the cavities 201-1 through 201-N receives a GRIN-rod lens adjacent to a shutter element in shutter array 103. Such lens serve to focus the incoming optical signal and thereby reduce switching losses. The second polymeric material preferably has a reflection-reducing optical refractive index. This can be provided by matching the optical refractive index of the second material to that of the GRIN-rod lens. It is also advantageous to utilize an optical matching gel, such as those available from the Cargille Corporation, between each GRIN-rod lens and its adjacent and aligned shutter element in array 103. The use of such a gel minimizes reflection-producing air gaps. The second embodiment shown in FIG. 2 also preferably incorporates a region 111 having a shoulder 202 formed therein. Shoulder 202 determines how far each of the fibers 104-1 through 104-N and fibers 105-1 through 105-N protrude into region 111 in the input and output plates. (For purposes of clarity, shoulder 202 has been enlarged in FIG. 2.)

To fabricate the optical switch shown in either FIG. 1 or 2, one stack of N signal splitting plates 101-1 through 101-N and another stack of N signal combining plates 102-1 through 102-N are formed. After each stack is formed, the plates in a stack are fastened together using spring clamps or other common fasteners so as to compress the plates together and minimize any interstitial space as required by subsequent steps. The channels are then filled with a hardening resin which is in the liquid state at the time of injection. The resin provides optical waveguiding and the cladding consists of the groove in each plate and the smooth surface of the adjacent plate. The surfaces of the waveguiding region should be optically smooth using well-known techniques. (See, for example, U.S. Pat. No. 4,995,686, which is hereby incorporated by reference.)

The input and output fibers 104-1 through 104-N and 105-1 through 105-N are inserted while the resin is still in liquid form as are GRIN-rod elements 201-1 through 201-N. Space is allowed around such elements to allow the resin to escape. The resin provides an optical matching medium to each received optical fiber and GRIN-rod lens as well as an adhesive to hold them in. Further strain relief may be added using techniques well known in the art.

Figure 3:
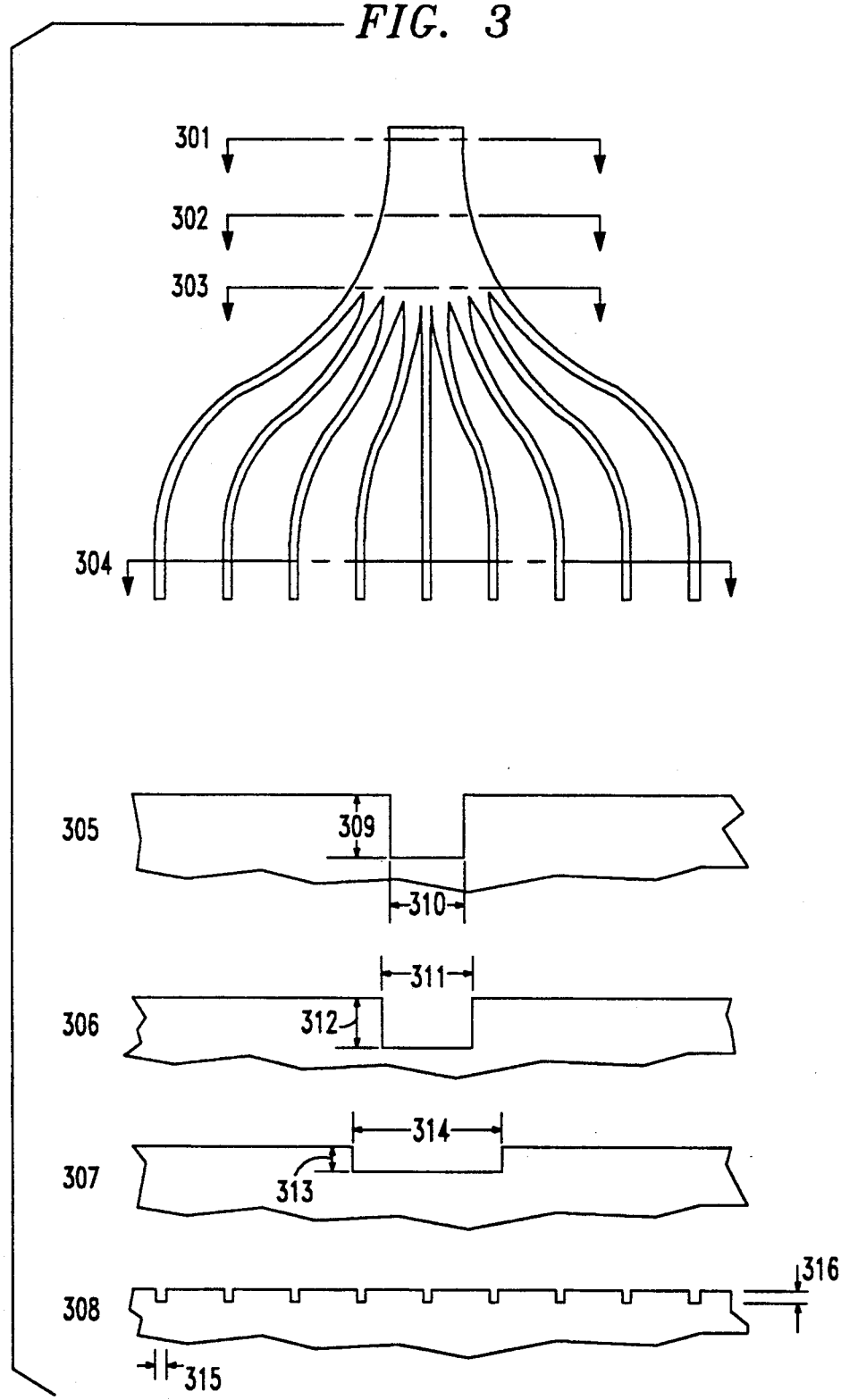
FIG. 3 shows plan and cross-sectional views of the channels formed in the molded optical splitter and combining elements.

FIG. 3 shows both a plan and several cross-sectional views of a signal splitter plate 101-1 through 101-N or a signal combiner plate 102-1 through 102-N. In the plan view, several cross-section lines 301, 302, 303 and 304 are shown with a corresponding representation of the cross section at such lines represented by views 305, 306, 307 and 308. Pursuant to either embodiment of the present invention, regions 111 and regions 106-1 through 106-N should be formed so that the cross-sectional area of the optical signal conducting region(s) at any cross section should be constant. As a result, referring to view 305, the product of dimensions 309 times 310 is equal to the product of dimensions 311 times 312 which is equal to the product of dimensions 313 times 314 which, in turn, is equal to N times the product of dimensions 315 times 316. (In FIG. 3, N is equal to 9.) This preserves the mode volume of these waveguiding structures. Also, the cross-sectional areas should change very gradually and adiabatically so as to minimize optical signal loss.

Figure 4:
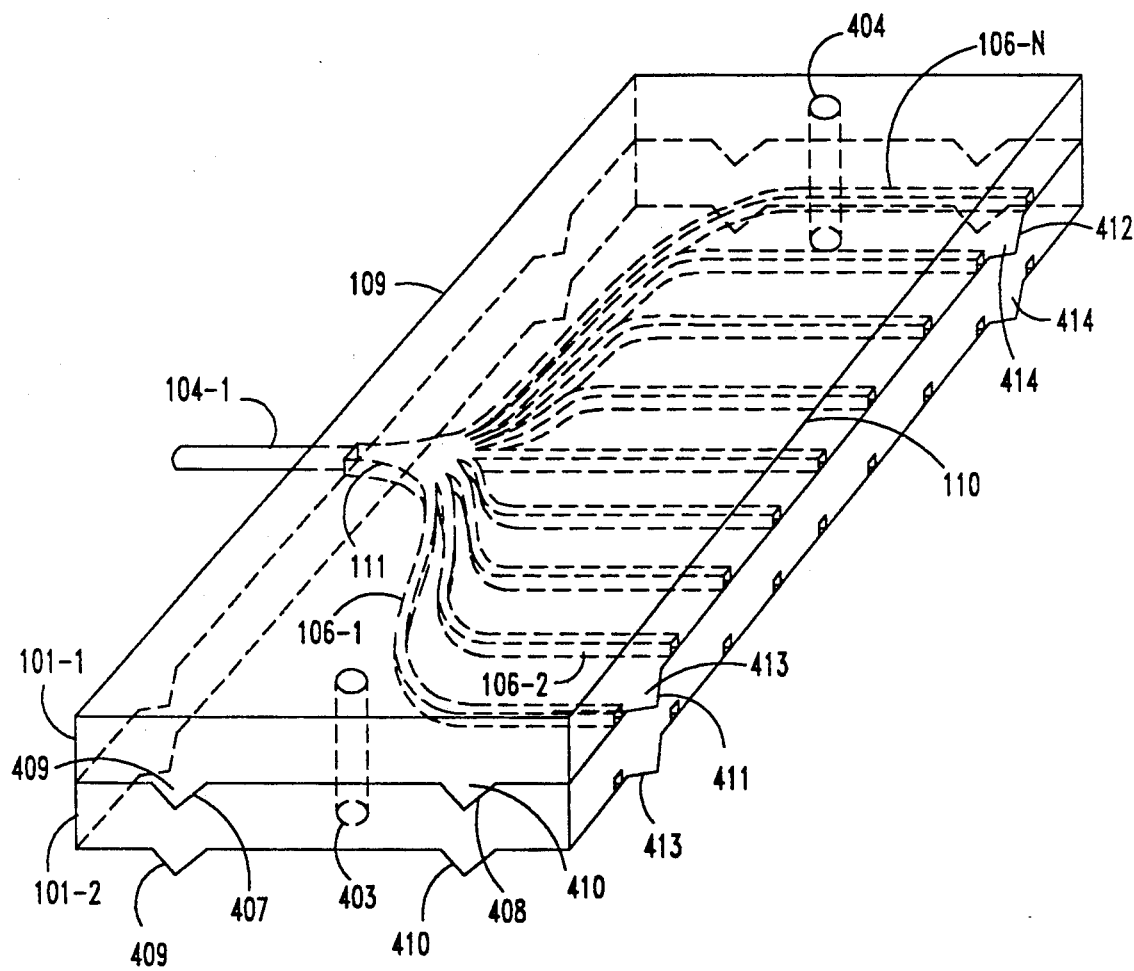
FIGS. 4 and 5 are perspective views which show further features of the molded optical splitter and combiner elements which facilitate stacking.

The molding of the optical signal splitter and combining plates may as shown in FIG. 4, advantageously incorporate alignment holes 403 and 404 through which alignment pins may be inserted to hold the stack of N plates in permanent alignment. Each of such plates may also preferably incorporate, as shown in FIG. 4, grooves 407 and 408 and mating protrusions 409 and 410 which keep the N signal splitting or combining plates in a stack aligned in one lateral direction and grooves 411 and 412, extending perpendicular to grooves 407 and 408 and mating protrusions 413 and 414 which keep the N signal splitting or combining plates aligned in a second lateral direction. The compression by spring clamps (not shown) keeps the spacing between vertical rows aligned with the vertical spacing of the switching elements of switching array 103.

Figure 5:
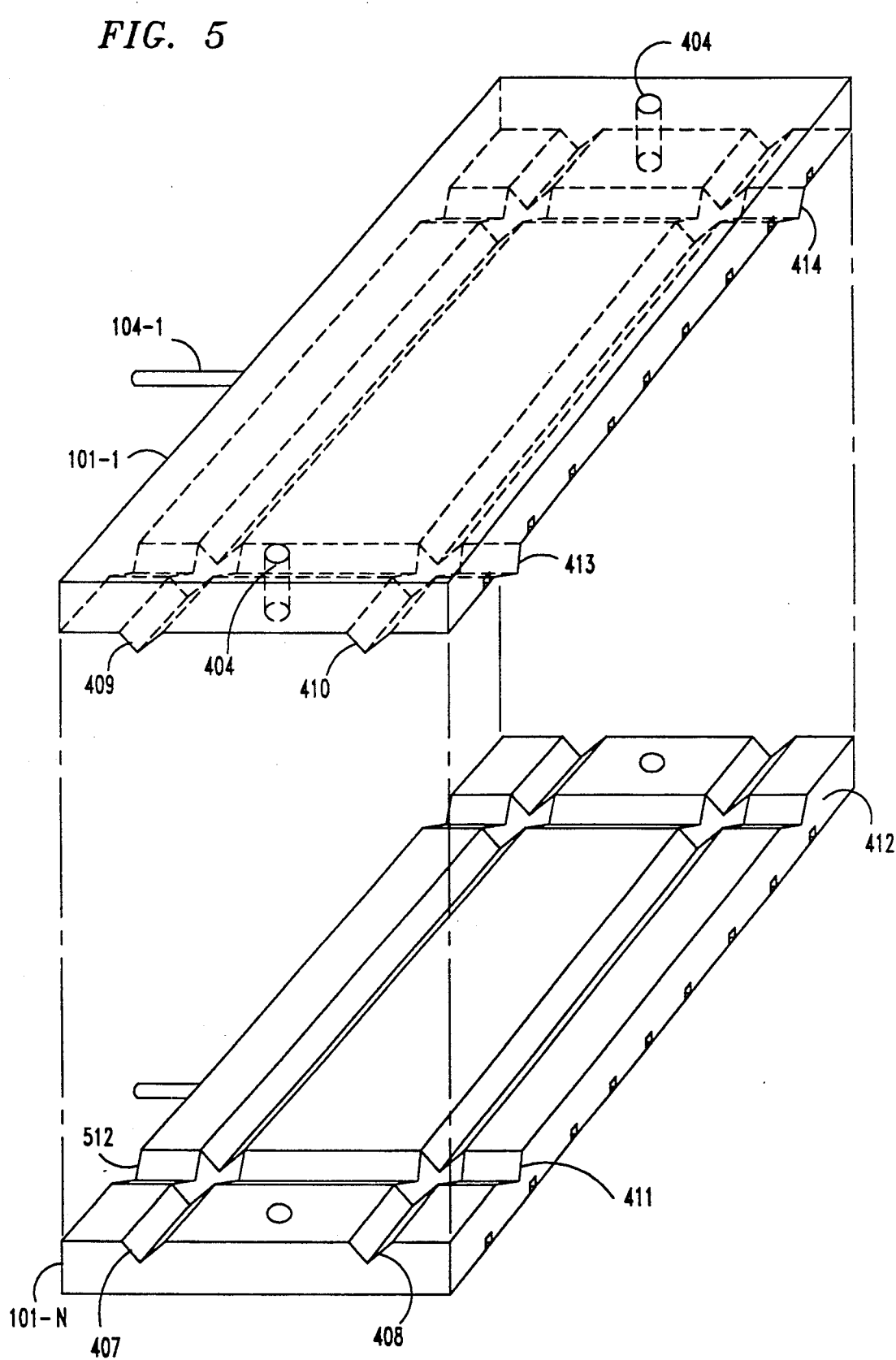

FIG. 5 shows more detail of how the above-described protrusions and grooves provide for plate alignment in two dimensions.

In either of the disclosed embodiments, the input and output plates may be molded of either Teflon ® (a registered trademark of Dupont) FEP (fluorinated ethylene propylene) or PVDF (polyvinylidine fluoride). Suitable second polymeric materials for filling the first and second regions in each splitter or combiner plate can be either vinyl terminated dimethyl siloxsane or polyurethane. A suitable microparticle is that manufactured by Cabot, Inc., a U.S. Corporation under the trade name Cabosil. Each of such microparticles is an aggregation of very small particles of silica material produced by flame hydrolysis of silicon tetrachloride. The maximum dimension of a microparticle is less than 100 microns and the concentration of such microparticles in the second polymeric material is 0.5% by weight.

While the present invention has been described as an optical switch, the disclosed structure can also provide optical wavelength multiplexing if different input optical fibers conduct signals of different wavelengths. Such different wavelengths could then be combined, as desired, on a single output fiber. In addition, while the disclosed switch uses an N by N structure, any number of input fibers could be selectively coupled to any other number of output fibers. Hence, the present invention is applicable to an M by N switch, where M and N are different predetermined integers. Finally, while in the disclosed embodiments, the stack of signal combining plates is rotated 90 degrees with respect to the stack of signal splitting plates. This angle does not have to be 90 degrees but can be any predetermined nonzero angle.

We claim:

1. An optical device comprising
    optical signal splitting means including a plurality of stacked first plates, each first plate molded of a first material so as to define a first cavity extending from a first end to an interior position and a plurality of second cavities extending from said interior position to a second end, each of said first and second cavities filled with a second material which is capable of conducting an optical signal from said first end to said second end;
    optical signal combining means including a plurality of stacked second plates, each second plate molded of a first material so as to define a first cavity extending from a first end to an interior position and a plurality of second cavities extending from said interior position to a second end, each of said first and second cavities in said second plates filled with a second material which is capable of conducting an optical signal from said first end to said second end of each second plate; and
    an array of optical shutters, disposed between said stacks of first and second plates, each shutter being operable to conduct or block an optical signal from an aligned filled second cavity in one plate to an aligned filled second cavity in one second plate.

2. The optical device of claim 1 wherein each first plate is molded in an identical fashion to each second plate.

3. The optical device of claim 1 wherein said first material used to mold said first plates is identical to said first material used to mold said second plates.

4. The optical device of claim 1 wherein said first material used to mold said first plates is different from said first material used to mold said second plates.

5. The optical device of claim 1 wherein the stack of first plates and the stack of second plates are disposed at some predetermined angle with respect to one another.

6. The optical device of claim 5 wherein the predetermined angle is 90 degrees.

7. The optical device of claim 1 wherein said second material used to fill said first and each of said second cavities in said first plates is identical to said second material used to fill said first and each of said second cavities in said second plates.

8. The optical device of claim 1 wherein said second material used to fill said first and each of said second cavities in said first plates is different from said second material used to fill said first and each of said second cavities in said second plates.

9. The optical device of claim 1 wherein said cavities are filled with a material which is capable of receiving and fusing to an inserted optical fiber prior to hardening.

10. The optical device of claim 1 wherein each second cavity in said first and second plates is formed so as to receive a lens.

11. The optical device of claim 1 wherein said first and second plates are molded with mating grooves and protuberances so as to facilitate alignment of said first and second plates in their respective stacks.

12. The optical device of claim 11 wherein said mating grooves and protuberances include a pair of orthogonally disposed grooves and another pair of orthogonally disposed protuberances.

13. The optical device of claim 1 wherein each first and each second plate is molded with a pair of holes adapted to receive an alignment pin.

14. The optical device of claim 1 wherein said first cavity in each of said first and second plates incorporates a shoulder.

15. The optical device of claim 1 wherein said second material used to fill said first cavity in said first plates includes microparticles.

16. A method of fabricating an optical device comprising the steps of
    forming a first stack of first plates, each first plate molded of a first material so as to define a first cavity extending from a first end to an interior position and a plurality of second cavities extending from said interior position to a second end, each of said first and second cavities filled with a second material which is capable of conducting an optical signal from said first end to said second end;
    forming a second stack of second plates, each second plate molded of a first material so as to define a first cavity extending from a first end to an interior position and a plurality of second cavities extending from said interior position to a second end, each of said first and second cavities in said second plates filled with a second material which is capable of conducting an optical signal from said first end to said second end of each second plate; and
    disposing an array of optical shutters between said stacks of first and second plates, each shutter being operable to conduct or block an optical signal from an aligned filled second cavity in one first plate to an aligned filled second cavity in one second plate.

17. An optical device comprising a plate molded of a first material, said plate defining a first cavity extending from a first end to an interior position and a plurality of second cavities extending from said interior position to a second end, said first and each of said second cavities being filled with a second material which is capable of conducting an optical signal from said first end to said second end.

18. A method of fabricating an optical device comprising the steps of
    molding a plate of a first material, said plate defining a first cavity extending from a first end to an interior position and a plurality of second cavities extending from said interior position to a second end, and
    filling said first and each of said second cavities with a second material capable of conducting an optical signal from said first end to said second end.

* * * * *